(12) United States Patent
Kogoh et al.

(10) Patent No.: US 12,395,542 B2
(45) Date of Patent: Aug. 19, 2025

(54) METHOD FOR STREAMING MULTIMEDIA BASED ON USER PREFERENCES

(71) Applicant: International Business Machines Corporation, Armonk, NY (US)

(72) Inventors: Makoto Kogoh, Sumida-Ku (JP); Takehiko Amano, Yokohama (JP); Tomoaki Mori, Funabashi (JP); Takumi Hongo, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 17/521,915

(22) Filed: Nov. 9, 2021

(65) Prior Publication Data

US 2023/0145700 A1    May 11, 2023

(51) Int. Cl.
*H04L 65/80*      (2022.01)
*G06V 20/40*      (2022.01)
*H04L 65/612*    (2022.01)

(52) U.S. Cl.
CPC .............. *H04L 65/80* (2013.01); *G06V 20/41* (2022.01); *G06V 20/49* (2022.01); *H04L 65/612* (2022.05)

(58) Field of Classification Search
CPC ..... H04L 65/80; H04L 65/612; H04L 65/752; G06V 20/41; G06V 20/49
See application file for complete search history.

(56) References Cited

U.S. PATENT DOCUMENTS 7,587,454 B2   9/2009 Shabtai
9,253,235 B2   2/2016 Lewis
(Continued)

FOREIGN PATENT DOCUMENTS

CN    101656888 B    1/2013
JP    2002369174 A    12/2002
(Continued)

OTHER PUBLICATIONS

"How Big Is a Movie File?", Z Systems, Inc., downloaded from the Internet on Sep. 10, 2021, 3 pages, <https://zsyst.com/2016/11/how-big-is-a-movie-file/>.
(Continued)

*Primary Examiner* — Michael A Keller
*Assistant Examiner* — Thao D Duong
(74) *Attorney, Agent, or Firm* — Daniel Yeates

(57) ABSTRACT

A computer-implemented method for streaming multimedia data is disclosed. The computer-implemented method includes identifying a high importance video segment yet to be streamed to a buffer, determining, based on a current network bandwidth, if the high importance video segment can be streamed at a video quality above a predetermined threshold, responsive to determining, based on the current network bandwidth, that the high importance video segment cannot be streamed at a video resolution above a predetermined threshold, determining if there is a low importance video segment yet to be streamed to the buffer prior to the high importance video segment, and responsive to determining that there is a low importance video segment yet to be streamed to the buffer prior to the high importance video segment, adjusting prefetching of the high importance video segment in order to stream the high importance video segment at the video resolution above the predetermined threshold.

17 Claims, 11 Drawing Sheets

(56) References Cited

U.S. PATENT DOCUMENTS

| | | | |
|---|---|---|---|
| 9,392,042 B1* | 7/2016 | Caballero | H04L 65/752 |
| 10,313,745 B2 | 6/2019 | Lederer | |
| 2013/0163429 A1* | 6/2013 | Dunstan | H04L 47/263 |
| | | | 370/235 |
| 2015/0350277 A1* | 12/2015 | Voris | H04L 65/752 |
| | | | 709/219 |
| 2020/0037017 A1* | 1/2020 | Nilsson | H04N 21/26216 |
| 2022/0027407 A1* | 1/2022 | Ikezoye | G06F 16/637 |
| 2022/0239720 A1* | 7/2022 | Madanapalli | H04L 47/2483 |
| 2022/0264168 A1* | 8/2022 | Dahl | H04N 21/23439 |
| 2023/0103596 A1* | 4/2023 | Chundi | G06F 3/04842 |
| | | | 715/716 |

FOREIGN PATENT DOCUMENTS

| | | | |
|---|---|---|---|
| JP | 2003179891 A | 6/2003 | |
| JP | 5930562 B1 | 6/2016 | |
| JP | 2017157903 A | 9/2017 | |
| JP | 2020188387 A | 11/2020 | |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

METHOD FOR STREAMING MULTIMEDIA BASED ON USER PREFERENCES

BACKGROUND

The present invention relates generally to the field of multimedia streaming, and more particularly to, video streaming based on video scene content and user streaming preferences.

Streaming (i.e., media streaming, multimedia streaming, or data streaming) is the constant delivery of data (i.e., text, audio, images, animations, video, or any combination thereof) from a provider to a client end-user. Generally, streaming describes the act of playing media on one device when the media is stored on another device. More particularly, media streaming is video, or audio content sent in compressed form over the Internet and played immediately, rather than being downloaded or saved to the hard drive of the client end-user. Multimedia streaming quality is based on the bandwidth of the network transporting the multimedia data. In the event, not enough data is transferred and downloaded before playing a segment of a video, the video will either pause or be displayed at a lower resolution quality.

SUMMARY

According to one embodiment of the present invention, a computer-implemented method for streaming multimedia data is disclosed. The computer-implemented method includes identifying a high importance video segment yet to be streamed to a buffer. The computer-implemented method further includes determining, based on a current network bandwidth, if the high importance video segment can be streamed at a video quality above a predetermined threshold. The computer-implemented method further includes responsive to determining, based on the current network bandwidth, that the high importance video segment cannot be streamed at a video resolution above a predetermined threshold, determining if there is a low importance video segment yet to be streamed to the buffer prior to the high importance video segment. The computer-implemented method further includes responsive to determining that there is a low importance video segment yet to be streamed to the buffer prior to the high importance video segment, adjusting prefetching of the high importance video segment in order to stream the high importance video segment at the video resolution above the predetermined threshold.

According to another embodiment of the present invention, a computer program product for streaming multimedia data is disclosed. The computer program product includes one or more computer readable storage media and program instructions stored on the one or more computer readable storage media. The program instructions include instructions to identify a high importance video segment yet to be streamed to a buffer. The program instructions further include instructions to determine, based on a current network bandwidth, if the high importance video segment can be streamed at a video quality above a predetermined threshold. The program instructions further include instructions to responsive to determining, based on the current network bandwidth, that the high importance video segment cannot be streamed at a video resolution above a predetermined threshold, determine if there is a low importance video segment yet to be streamed to the buffer prior to the high importance video segment. The program instructions further include instructions to responsive to determining that there is a low importance video segment yet to be streamed to the buffer prior to the high importance video segment, adjust prefetching of the high importance video segment in order to stream the high importance video segment at the video resolution above the predetermined threshold.

According to another embodiment of the present invention, a computer system for streaming multimedia data is disclosed. The computer system includes one or more computer processors, one or more computer readable storage media, and computer program instructions, the computer program instructions being stored on the one or more computer readable storage media for execution by the one or more computer processors. The program instructions include instructions to identify a high importance video segment yet to be streamed to a buffer. The program instructions further include instructions to determine, based on a current network bandwidth, if the high importance video segment can be streamed at a video quality above a predetermined threshold. The program instructions further include instructions to responsive to determining, based on the current network bandwidth, that the high importance video segment cannot be streamed at a video resolution above a predetermined threshold, determine if there is a low importance video segment yet to be streamed to the buffer prior to the high importance video segment. The program instructions further include instructions to responsive to determining that there is a low importance video segment yet to be streamed to the buffer prior to the high importance video segment, adjust prefetching of the high importance video segment in order to stream the high importance video segment at the video resolution above the predetermined threshold.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
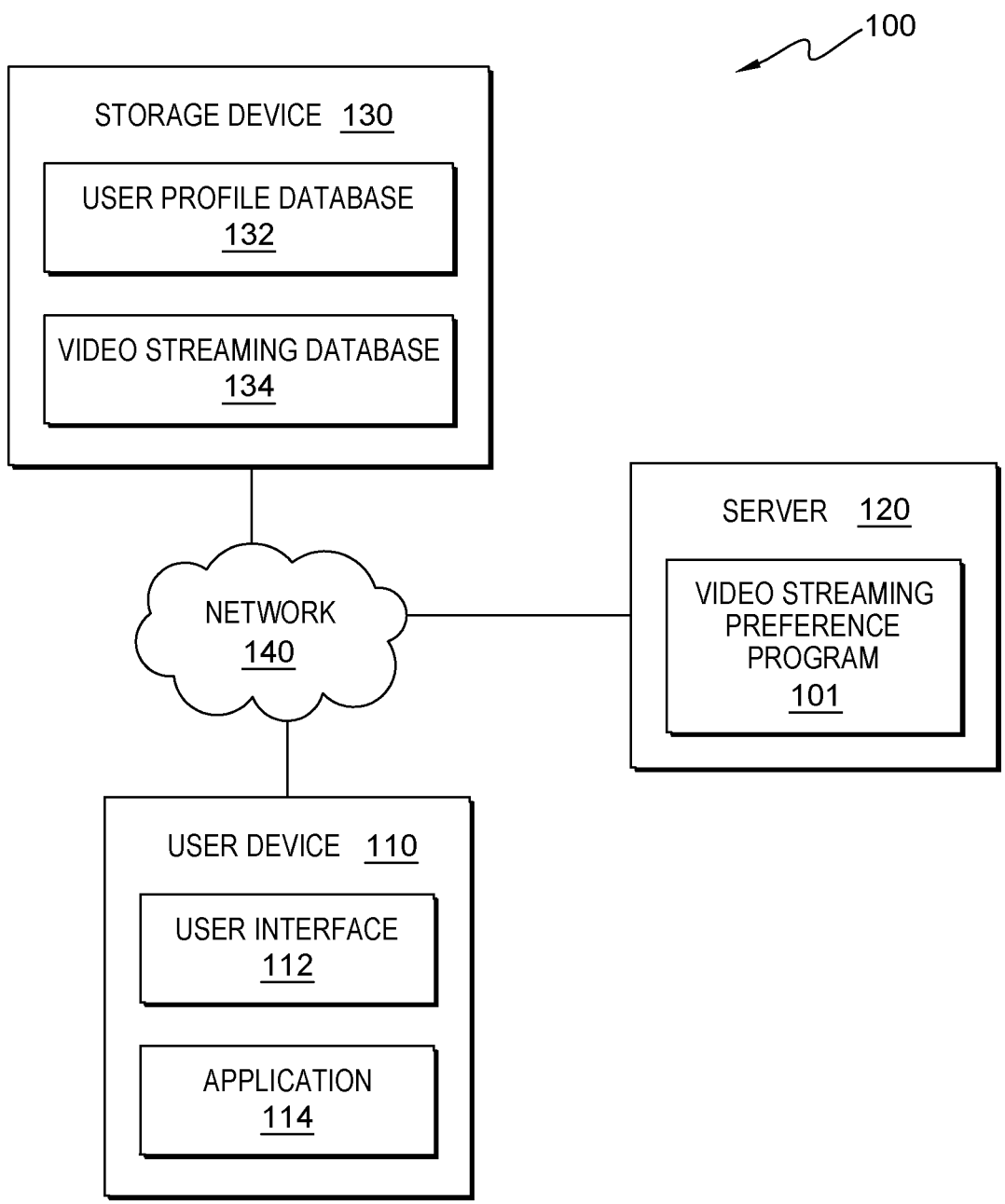
FIG. 1 is a block diagram of a network computing environment for streaming multimedia data based on video scene content and user streaming preferences, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of multimedia streaming, and more particularly to, video streaming based on video scene content and user streaming preferences.

Video and multimedia streaming is popular for users to watch and stream movies. The higher the quality of the multimedia being streamed, the more data that needs to be transferred over a network in order to watch the multimedia in a higher quality. High performance cameras, found even on smartphones, are capable of generating high quality video (e.g., 4K or 60 frames per second (fps)). Streaming replication allows streaming to start without batch downloading of data. However, problems may arise when network bandwidth prevents streaming of a desired quality, in which significant performance issues may arise due to an unexpected transfer of a large capacity of data. When the required amount of data for a video is not able to be streamed, the video may be displayed at a lower quality.

Embodiments of the present invention recognize in instances when not enough data is streamed, a video will be displayed a lower desired quality. However, embodiments of the present invention further recognize users prefer some scenes, aspects, or sections of a video to be viewed at a higher quality than other scenes, aspects, or sections. Embodiments of the present invention compare the metadata associated with respective scenes of a streamed video to user streaming preferences to determine the importance of each scene or section of the streamed video. Embodiments of the present invention optimize video streaming quality of particular scenes when network bandwidth is limited by prefetching and buffering high importance scenes in a high quality. The determination of high quality scenes is based on comparing scene content to one or more user streaming preferences. Embodiments of the present invention prefetch and buffer low importance video segments at a lower video quality and prefetch and buffer high importance video segments at a higher video quality that would otherwise exceed current network bandwidths. In other words, embodiments of the present invention reduce a data transfer rate of low important scenes (i.e., reduce the video quality of low important scenes) in order to increase the data transfer rate of high important scenes (i.e., increase the video quality of high important scenes) when the current network bandwidth is not capable of providing the high important scenes via high quality video.

In an embodiment, a video streaming preference program 101 determines metadata (e.g., video scene content) associated with respective scenes of a video to be streamed to a client. The video streaming preference program 101 generates a importance level for the respective scenes of the video based, at least in part, on comparing the metadata and user streaming preferences (e.g., video quality preferences associated with particular video content) to the metadata associated with respective scenes of the video. The video streaming preference program 101 determines whether a data transfer rate required to transmit a high quality scene (e.g., above a predetermined image quality) having a high importance level (e.g., above a predetermined level of importance) exceeds an upper limit data transfer rate of a current network bandwidth. Upon determining that the data transfer rate required to transmit the high quality scene having a high importance level exceeds the upper limit data transfer rate of the current network bandwidth, video streaming preference program 101 prefetches and buffers the high quality scene having the high importance level is prefetched and buffered on the client device prior to streaming the high importance scene to the client device. If prefetching and buffering the high importance scene in the high quality leads to exceeding the upper limit data transfer rate of the current network bandwidth, a data transfer rate of data associated with a scene having a low importance rate (e.g. below a predetermined level of importance) is reduced to allow for an increased data transfer rate of the high importance scene such that the high importance scene is able to be displayed having a video quality that exceeds the current network bandwidth.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment for streaming multimedia data based on video scene content and user streaming preferences, generally designated 100, in accordance with at least one embodiment of the present invention. In an embodiment, network computing environment 100 may be provided by cloud computing environment 50, as depicted and described with reference to FIG. 10 in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art that can buffer and display video content streamed from another computing device, such as server 120. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 3.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 displays the streamed multimedia. In an embodiment, a user inputs their user preferences via user interface 112.

Application 114 can be representative of one or more applications (e.g., an application suite) that operate on user device 110. In an embodiment, application 114 is representative of one or more applications (e.g., social media applications and multimedia streaming applications) located on user device 110. In various example embodiments, application 114 can be an application that a user of user device 110 utilizes to view streamed multimedia. In various example embodiments, application 114 can be an application that a user of user device 110 utilizes to input user streaming preferences. In an embodiment, application 114 can be a client-side application associated with a server-side application running on server 120 (e.g., a client-side application associated with video streaming preference program 101). In an embodiment, application 114 can operate to perform processing steps of video streaming preference program 101 (i.e., application 114 can be representative of video streaming preference program 101 operating on user device 110).

Server 120 is configured to provide resources (e.g., multimedia content) to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

Figure 9:
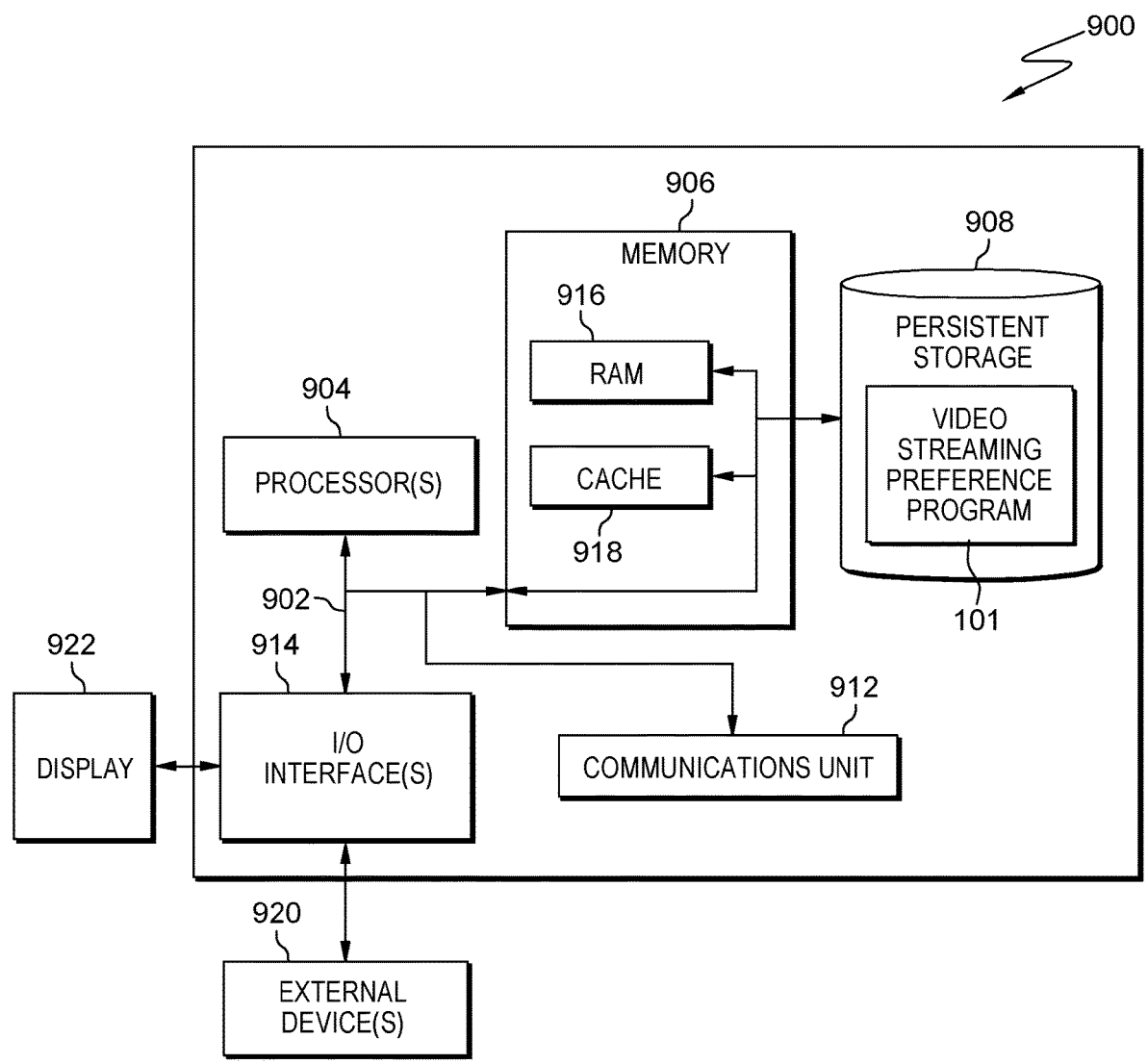
FIG. 9 is a block diagram depicting components of a computer, generally designated 900, suitable for executing a video streaming preference program 101 in accordance with at least one embodiment of the present invention.
Figure 10:
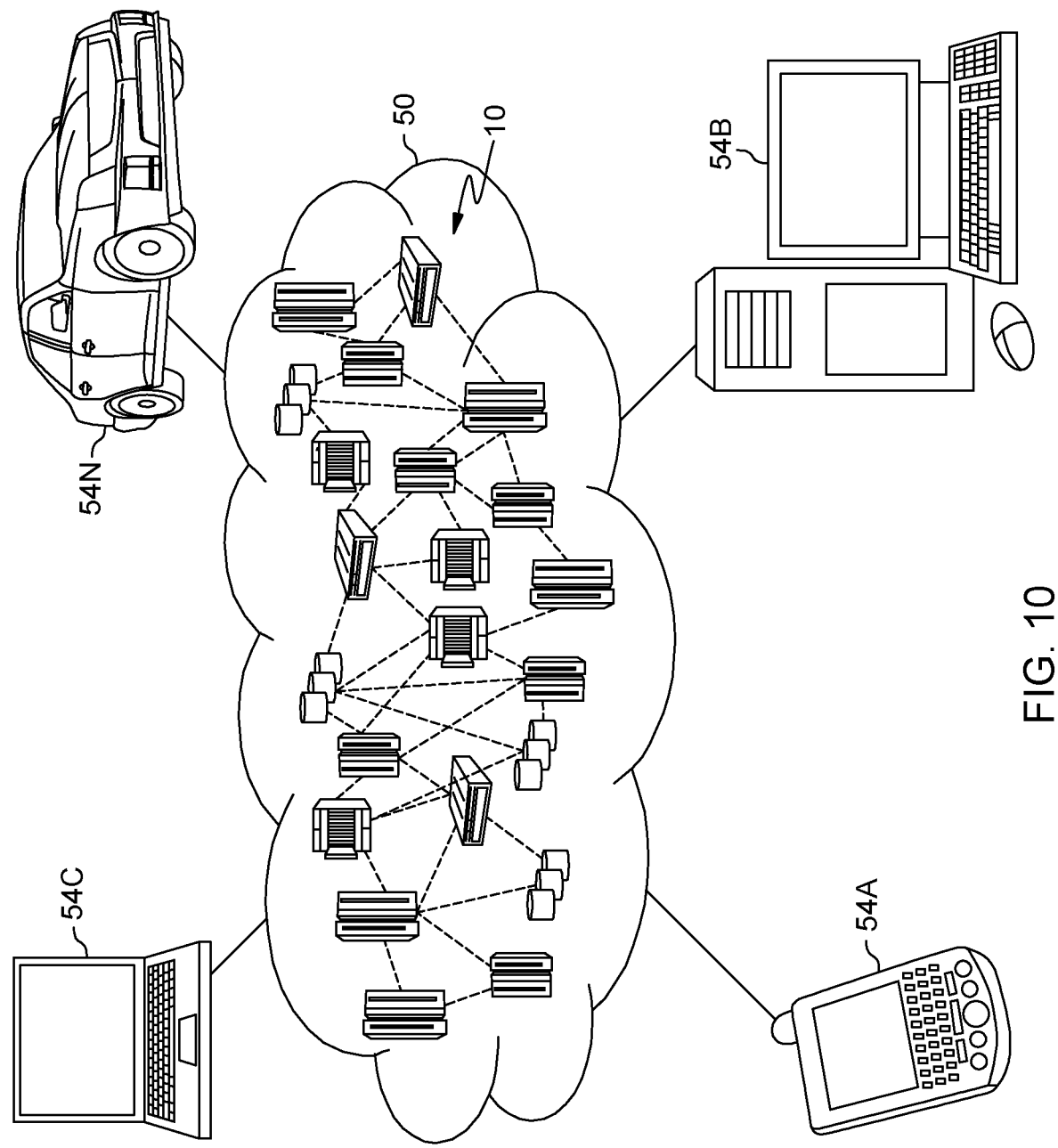
FIG. 10 is a block diagram depicting a cloud computing environment 50 in accordance with at least one embodiment of the present invention.

Server 120 may include components as depicted and described in detail with respect to cloud computing node 10, as described in reference to FIG. 10 in accordance with at least one embodiment of the present invention. Server 120 may include components, as depicted and described in detail with respect to computing device 900 of FIG. 9, in accordance with at least one embodiment of the present invention.

Server 120 includes video streaming preference program 101. In an embodiment, video streaming preference program 101 may be configured to access various data sources, such as a user profile database 132 that may include personal data, content, contextual data, or information that a user does not want to be processed. Personal data includes personally identifying information or sensitive personal information as well as user information, such as location tracking or geo-location information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, video streaming preference program 101 enables the authorized and secure processing of personal data. In an embodiment, video streaming preference program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, video streaming preference program 101 provides information regarding personal data and the nature (e.g., type, scope, purpose, duration, etc.) of the processing. In an embodiment, video streaming preference program 101 provides a user with copies of stored personal data. In an embodiment, video streaming preference program 101 allows for the correction or completion of incorrect or incomplete personal data. In an embodiment, video streaming preference program 101 allows for the immediate deletion of personal data.

In various embodiments, storage device 130 is a secure data repository for persistently storing user profile information and video streaming information. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, storage device 130 includes user profile database 132 and video streaming database 134. In an embodiment, user profile database 132 includes information on user streaming preferences. In an embodiment, user streaming preferences are received via user input and stored in user profile database 132. In an embodiment, user streaming preferences include information on scenes, characters, and other aspects of multimedia the user likes, prefers, or does not like or does not prefer. In an embodiment, user streaming preferences include user designated importance levels of particular video content. In an embodiment, the user selects what scenes, actors, or characters to be streamed at a high quality. For example, user input includes information to stream scenes with Actor A at high quality. In an embodiment, user streaming preferences include importance levels of particular video content determined based on comparing video scene content to one or more user preferences. In an embodiment, user profile database 132 includes information associated with one or more different users. For example, user profile database 132 includes user profiles with information on user streaming preferences for one or more different users. For example, user profile database 132 includes user profile A for user A and user profile B for user B.

In an embodiment, video streaming database 134 includes information on the video scene contents of multimedia to be streamed. In an embodiment, video streaming database 134 includes information on the segmented scenes and characters in the streamed multimedia. For example, video streaming database 134 includes information on the time within the streamed multimedia that a certain scene or character appears. Such as, character A is displayed from 1 minute 2 seconds to 1 minute 50 seconds. In an embodiment, video streaming database 134 includes information or tags associated with the type or scenario of the scene or segment of the streamed multimedia. For example, video streaming database 134 includes information that the second scene starting at 5 minutes and 6 seconds is an action scene. In an embodiment, video streaming database 134 includes information on the importance or weight of a scene or segment of the multimedia based on comparing the information on the scene or segment with the user streaming preferences. For example, if user preferences indicate a high preference for Actor A, video streaming database 134 includes information or tags associated with scenes with Actor A with a high preference, importance rating, or weight.

In an embodiment, video streaming preference program 101 utilizes user streaming preferences to determine what scenes or actors the user desires or match the user preferences. In an embodiment, video streaming preference program 101 streams scenes of a lower importance (e.g., below a predetermined threshold) to the user at a lower quality than scenes of a higher importance (e.g., above a predetermined threshold) to a user. In an embodiment, video streaming preference program 101 prefetches and buffers data for one or more scenes at the same time (i.e., in parallel). For example, if scene 4 includes the users favorite actor and scene 3 does not, scene 4 will be streamed at a higher quality than scene 3. In this example, video streaming preference program 101 prefetches and buffer data for both scene 4 and scene 3 while streaming or otherwise displaying scene 2 via user device 110. In an embodiment, video streaming preference program 101 prefetches and buffers data for one or more scenes in sequence. In an embodiment, video streaming preference program 101 increases the amount of buffering of a lower importance scene currently replicated in streaming in order to start buffering of a higher importance scene earlier than usual.

In an embodiment, video streaming preference program 101 collects or receives user preferences. In an embodiment, video streaming preference program 101 collects user preferences based on the user's viewing history. For example, video streaming preference program 101 determines user A watches predominately action movies and determines user A prefers action type movies, shows, and scenes with action. In this example, video streaming preference program 101 may assign a high importance level to action scenes. In an embodiment, video streaming preference program 101 receives user preferences by user input. For example, user B inputs on user device 110 that user B likes Actor C and Actor D. In an embodiment, video streaming preference program 101 generates one or more user profiles. For example, video streaming preference program 101 generates a user profile for each user with each users' preferences. For example, user profile A for user A includes user A's preferences and user input, such as user A's preferred actors.

In an embodiment, video streaming preference program 101 generates metadata for each scene of the streamed multimedia. In an embodiment, video streaming preference program 101 uses image recognition to determine objects, people, characters, actors, actions, places and scenes of the multimedia. In an embodiment, video streaming preference program 101 determines one or more scenes from the multimedia. In an embodiment, video streaming preference program 101 determines one or more actors from the multimedia. In an embodiment, video streaming preference program 101 generates a timestamp for one or more scenes, actors, or characters from the multimedia. For example, video streaming preference program 101 determines Actor A enters the scene from time 2:05 to 4:10 and generates a timestamp indicating Actor A is present in the multimedia from 2:05 to 4:10. In an embodiment, video streaming preference program 101 tags respective video scenes with respective importance levels. In an embodiment, video streaming preference program 101 tags the video content based on the types of scenes, characters, actors, and time period associated with the respective scenes.

In an embodiment, video streaming preference program 101 compares each scene based on the metadata from the scene and the one or more user preferences. For example, video streaming preference program 101 compares the metadata from the scene and the user preferences to determine an action scene at time 6:07 to 9:30 and user preferences for user A includes action scenes. In an embodiment, video streaming preference program 101 determines an importance level, score, or weight of each scene based on comparing the metadata from the scene and the one or more user preferences. For example, scene 1 includes Actors A and B, scene 2 includes Actor C, and user preferences indicates Actor C is User D's favorite actor. In this example, video streaming preference program 101 determines scene 2 is of a higher importance level than scene 1.

In an embodiment, video streaming preference program 101 compares the metadata obtained from the multimedia and the user preferences to optimize streaming quality including selection for video quality and prefetching. In an embodiment, video streaming preference program 101 determines one or more video segments yet to be streamed to the user with a high importance level. For example, video streaming preference program 101 determines scenes 3 and 4 are yet to be streamed to the user and scene 4 is of a high importance level and scene 3 is of a low importance level. In an embodiment, video streaming preference program 101 determines one or more video segments yet to be streamed based on a predetermined time window. In an embodiment, a predetermined time window is a time window after the point of time current streaming is retrieved. For example, a predetermined time window can include one or more scenes. In an example, if scene 1 is currently being viewed, scene 2 is of low importance, and scene 3 is of high importance.

In an embodiment, video streaming preference program 101 determines the data transfer rate and/or current bandwidth of the network. In an embodiment, video streaming preference program 101 determines whether a high importance video segment can be prefetched and buffered (either in parallel or in series with other video segments) at a video quality that exceeds current network bandwidth limits. In embodiments where bandwidth limits allow, video streaming preference program 101 prefetches and buffers high importance video segments at a video quality under current network bandwidth limit.

In an embodiment, video streaming preference program 101 determines if there is a low importance video segment prior to the high importance segment. Video streaming preference program 101 determines there is a low importance video segment prior to a high importance video segment if a segment with a lower importance is before a segment with a higher importance. For example, when video segment 3 is of lower importance than video segment 4.

In an embodiment, video streaming preference program 101 determines whether prefetching and buffering of a high importance scene from the current point of time can be made in time (i.e., by the time the high importance scene is to be displayed) in consideration of the current network capacity. In embodiments where it is determined that prefetching and buffering cannot be made in time before the scene is viewed, scenes within the time window are further checked to confirm there is a scene of low importance. In embodiments where there is a scene with low importance, video streaming preference program 101 determines whether prefetching and buffering can be completed in time by reducing picture quality of the low importance scene to secure additional bandwidth for prefetching and buffering the high importance scene. For example, if scene 1 is being viewed, and scene 2 is of low importance and scene 3 is of high importance, if enough time and bandwidth allows, video streaming preference program 101 streams metadata for scene 2 at a low quality and metadata for scene 3 at a high quality simultaneously.

In embodiments where there is not a low importance video segment prior to a high importance segment, video streaming preference program 101 prefetches and buffers high importance video segments at a video quality under current network bandwidth limits. In an embodiment, video streaming preference program 101 prefetches and buffers low importance video segments at a lower quality and prefetches and buffers high importance video segments at a video quality that exceeds current network bandwidth limits. In an embodiment, video streaming preference program 101 prefetches and buffers a currently streamed scene.

In an embodiment, video streaming preference program 101 prefetches and buffers video segments or scenes in series. In an embodiment, video streaming preference program 101 increases the amount of buffering of a scene currently replicated in streaming to start buffering an important scene earlier than normal in order to secure a required transfer amount. For example, video streaming preference program 101 finishes buffering earlier than usually by allocating a larger band than usual to a low importance scene 1 than medium importance scene 2. This example allows for an earlier start of buffering high importance scene 3. In an embodiment, video streaming preference program 101 prefetches and buffers video segments or scenes in parallel. For example, video streaming preference program 101 prefetches and buffers one or more video segments at the same time. For example, video streaming preference program 101 prefetches and buffers scene 2 at a low quality while also prefetching and buffering scene 3 at a high quality at the same time.

Figure 2:
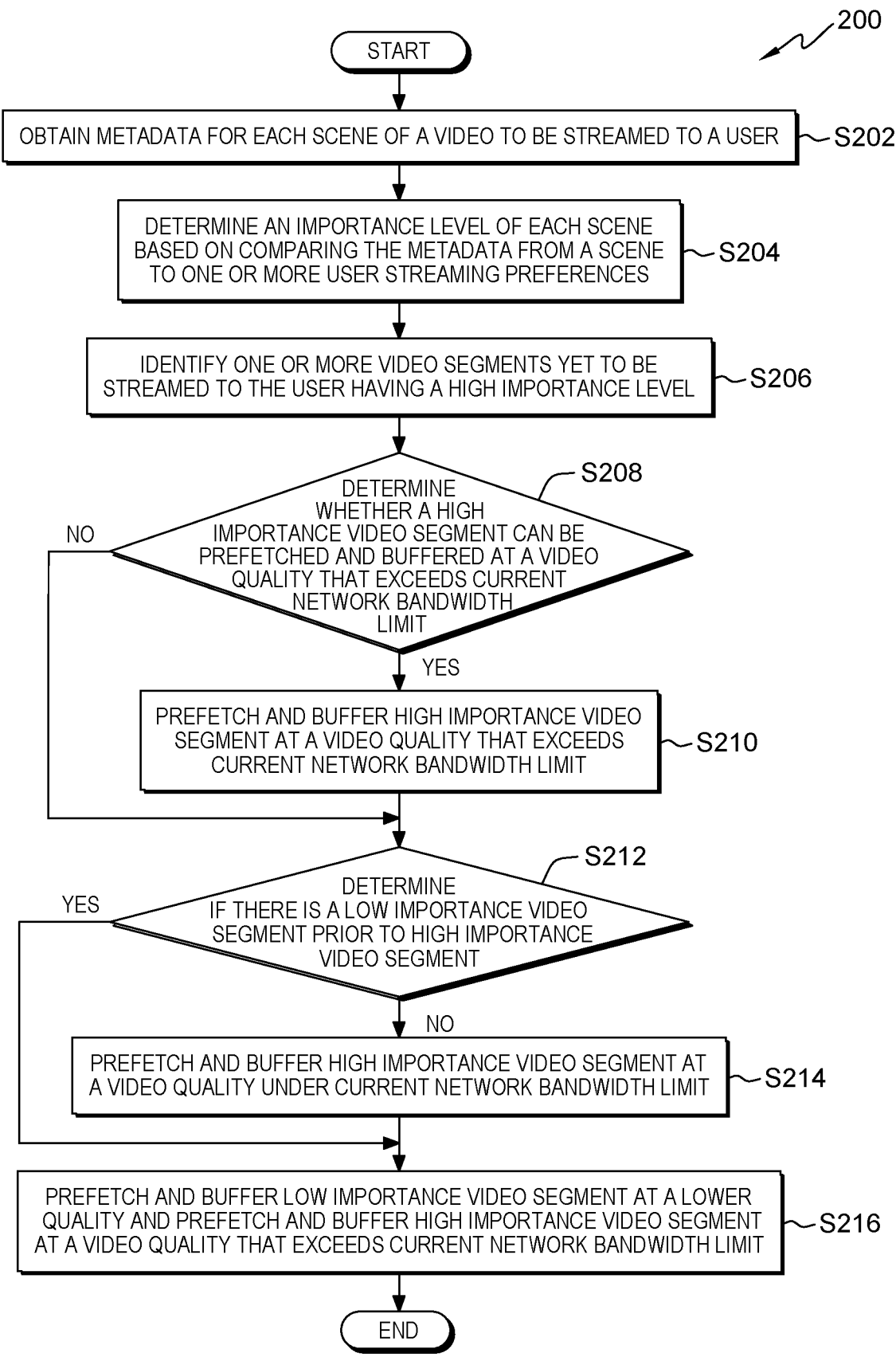
FIG. 2 is a flow chart diagram depicting operational steps for streaming multimedia data based on video scene content and user streaming preferences, generally designated 200, in accordance with at least one embodiment of the present invention.

FIG. 2 is a flow chart diagram depicting operational steps for streaming multimedia data based on video scene content and user streaming preferences, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, video streaming preference program 101 obtains metadata for each scene of a video to be streamed to a user. For example, video streaming preference program 101 uses image recognition to determine objects, people, characters, actors, actions, places and scenes of a video. In an embodiment, video streaming preference program 101 determines one or more scenes from the multimedia. In an embodiment, video streaming preference program 101 tags respective scenes with the particular content associated with the scene.

At step S204, video streaming preference program 101 determines an importance level of each scene based on comparing the metadata from a scene to one or more user streaming preferences. In an embodiment, video streaming preference program 101 determines an importance level, score, or weight of each scene based on comparing the metadata from the scene and the one or more user preferences.

At step S206, video streaming preference program 101 identifies one or more video segments yet to be streamed to the user having a high importance level (e.g., above a predetermined importance level). In an embodiment, video streaming preference program 101 determines one or more video segments yet to be streamed based on a predetermined time window. In an embodiment, the predetermined time window starts at a current point at which the video content is being displayed to a user and extends to a particular point in time in the video that has yet to be streamed to the user.

At decision step S208, video streaming preference program 101 determines whether a high importance video segment can be prefetched and buffered at a high video quality (e.g., above a predetermined number of pixels) based on a current network bandwidth limit or current network data transfer rate limit. If a high importance video segment can be prefetched and buffered at a high video quality based on the current network bandwidth limit or current network data transfer rate limit (decision step S208 "YES" branch), video streaming preference program 101 proceeds to step S210. If a high importance video segment cannot be prefetched and buffered at a high video quality based on a current network bandwidth limit or current network data transfer rate limit (decision step S208 "NO" branch), video streaming preference program 101 proceeds to decision step S212.

At step S210, video streaming preference program 101 prefetches and buffers the high importance video segment at a high video quality.

At decision step S212, video streaming preference program 101 determines if there is a low importance video segment (e.g., below a predetermined importance level) prior to a high importance video segment yet to be streamed. If there is not a low importance video segment prior to a high importance video segment (decision step S212 "NO" branch), video streaming preference program 101 proceeds to decision step S214. If there is a low importance video segment prior to a high importance video segment (decision step S212 "YES" branch), video streaming preference program 101 proceeds to step S216.

At step S214, video streaming preference program 101 prefetches and buffers the high importance video segment at a lower video quality (e.g., a lower video quality than indicated by a user's streaming preferences) based on the current network bandwidth limit or current network data transfer rate limit.

At step S216, video streaming preference program 101 prefetches and buffers the low importance video segment at a lower video quality (e.g., a lower video quality than indicated by a user's streaming preferences) and prefetches and buffers the high importance video segment at the high video quality that would otherwise exceed the current network bandwidth limit or current network data transfer rate. In an embodiment, video streaming preference program 101 prefetches and buffers the low quality video segment and the high quality video segment in parallel. In an embodiment, video streaming preference program 101 prefetches and buffers the low quality video scene and the high quality video scene in series.

Figure 3:
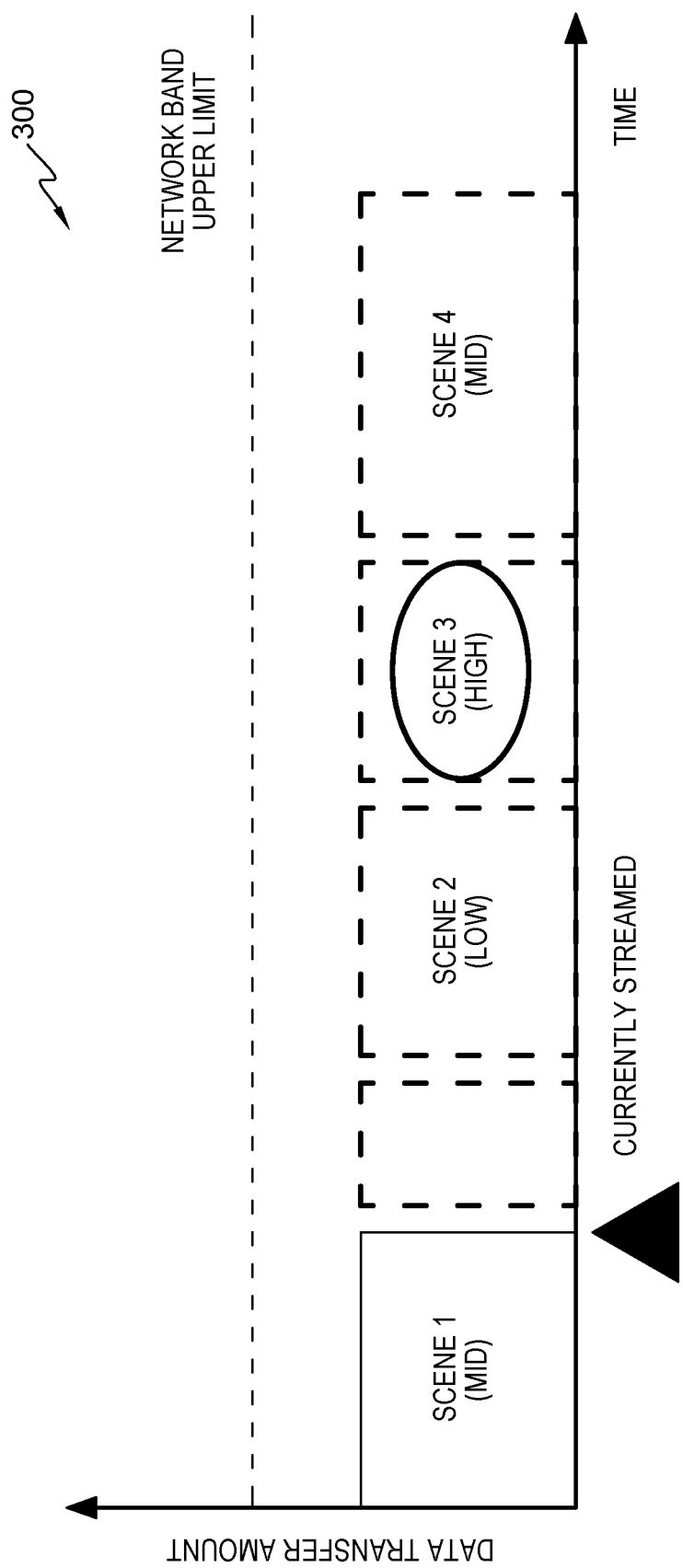
FIG. 3 is a diagram depicting a data transfer timeline for streaming multimedia data based on video scene content and user streaming preferences, generally designated 300, in accordance with at least one embodiment of the present invention.

FIG. 3 is a diagram depicting a data transfer timeline for streaming multimedia data based on user preferences, generally designated 300, in accordance with at least one embodiment of the present invention. In an embodiment, a scene with high importance within a predetermined time window after the point of time of current streaming is determined by video streaming preference program 101 by analyzing the metadata. In an embodiment, the "Currently Streamed" arrow indicates the current moment in time of the streamed video displayed to a user of user device 110. As depicted, part of SCENE 1 has already been streamed and displayed via user device 110, while another, subsequent portion of scene 1 (depicted as the empty dotted lined box adjacent to SCENE 1 (MID)) has yet to be streamed to user device 110. Further, all of SCENES 2 and 3 have not yet been streamed to user device 110. As depicted in FIG. 3, video streaming preference program 101 has determined that SCENE 1 and SCENE 4 have a middle importance level (i.e., an importance level between a predetermined range or a weight/score between a predetermined range), SCENE 2 has a low importance level (i.e., an importance level below a predetermined threshold or a weight/score below a predetermined weight/score), and SCENE 3 has a high importance level (i.e., an importance level above a predetermined threshold or a weight/score above a predetermined weight/score).

Figure 4:
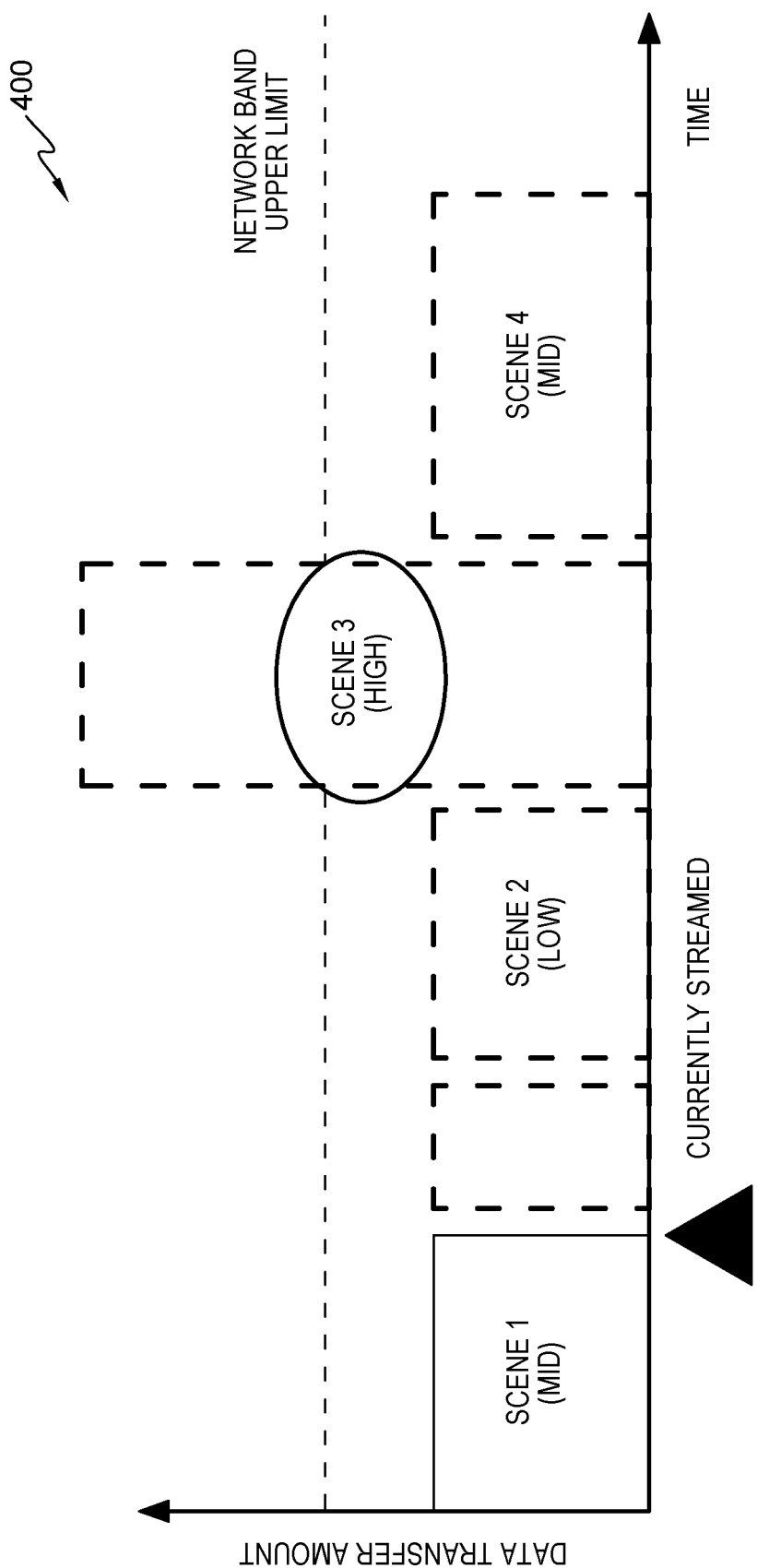
FIG. 4 is a diagram depicting a data transfer timeline for streaming multimedia data based on video scene content and user streaming preferences, generally designated 400, in accordance with at least one embodiment of the present invention.

FIG. 4 is a diagram depicting a data transfer timeline for streaming multimedia data based on user preferences, generally designated 400, in accordance with at least one embodiment of the present invention. In an embodiment, upon video streaming preference program 101 detecting a scene with high importance (SCENE 3) within the predetermined time window, a data transfer amount required to stream SCENE 3 at a high image quality (i.e., above a predetermined video resolution) is obtained to determine whether SCENE 3 can be streamed in time (i.e., without causing a delay in displaying the video to a user) based on a current network bandwidth (i.e., a maximum data transfer rate of the network). As depicted in FIG. 4, the data transfer amount required to stream SCENE 3 in a high quality exceeds the upper limit of the current network bandwidth (i.e. exceeds the maximum data transfer rate of the network).

Figure 5:
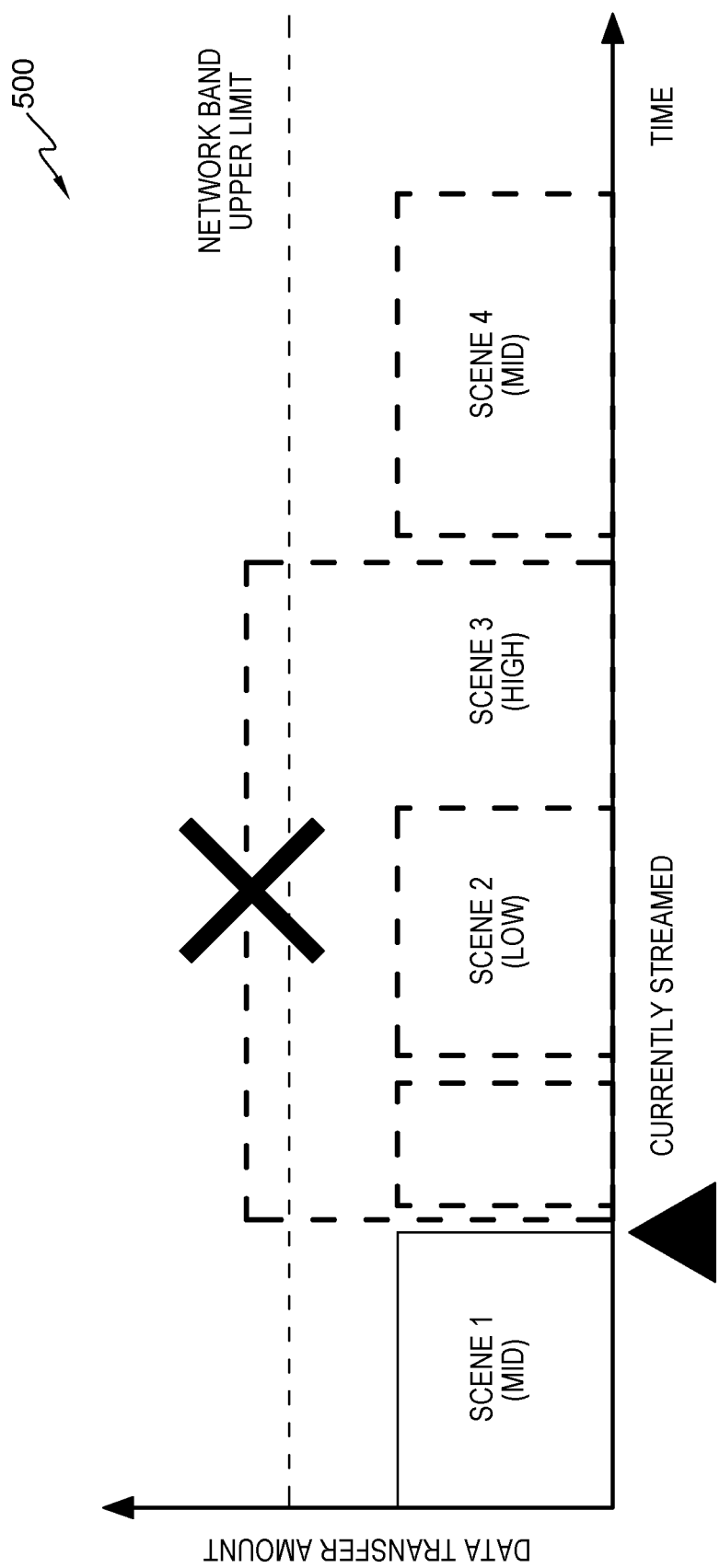
FIG. 5 is a diagram depicting a data transfer timeline for streaming multimedia data based on video content and user streaming preferences, generally designated 500, in accordance with at least one embodiment of the present invention.

FIG. 5 is a diagram depicting a data transfer timeline for streaming multimedia data based on user preferences, generally designated 500, in accordance with at least one embodiment of the present invention. In an embodiment, video streaming preference program 101 determines whether prefetching and buffering the subsequent portion of SCENE 1, SCENE 2, and SCENE 3 at a current image quality (i.e., at a current video resolution) of can be streamed from the current point of time 301 without a delay in displaying any of the scenes based on the current network bandwidth (i.e., the maximum data transfer rate of the network). In other words, video streaming preference program 101 determines whether the subsequent portion of SCENE 1, SCENE 2, and SCENE 3 can be streamed at the data transfer amount as indicated in FIG. 5. As depicted in FIG. 5, video streaming preference program 101 has determined (as indicated by the "X") that prefetching and buffering the subsequent portion of SCENE 1, SCENE 2, and SCENE 3 at the indicated data transfer amounts in order to stream SCENE 3 at a high image quality from the current point of time 301 cannot be made without causing a delay in displaying the video to the user.

Figure 6:
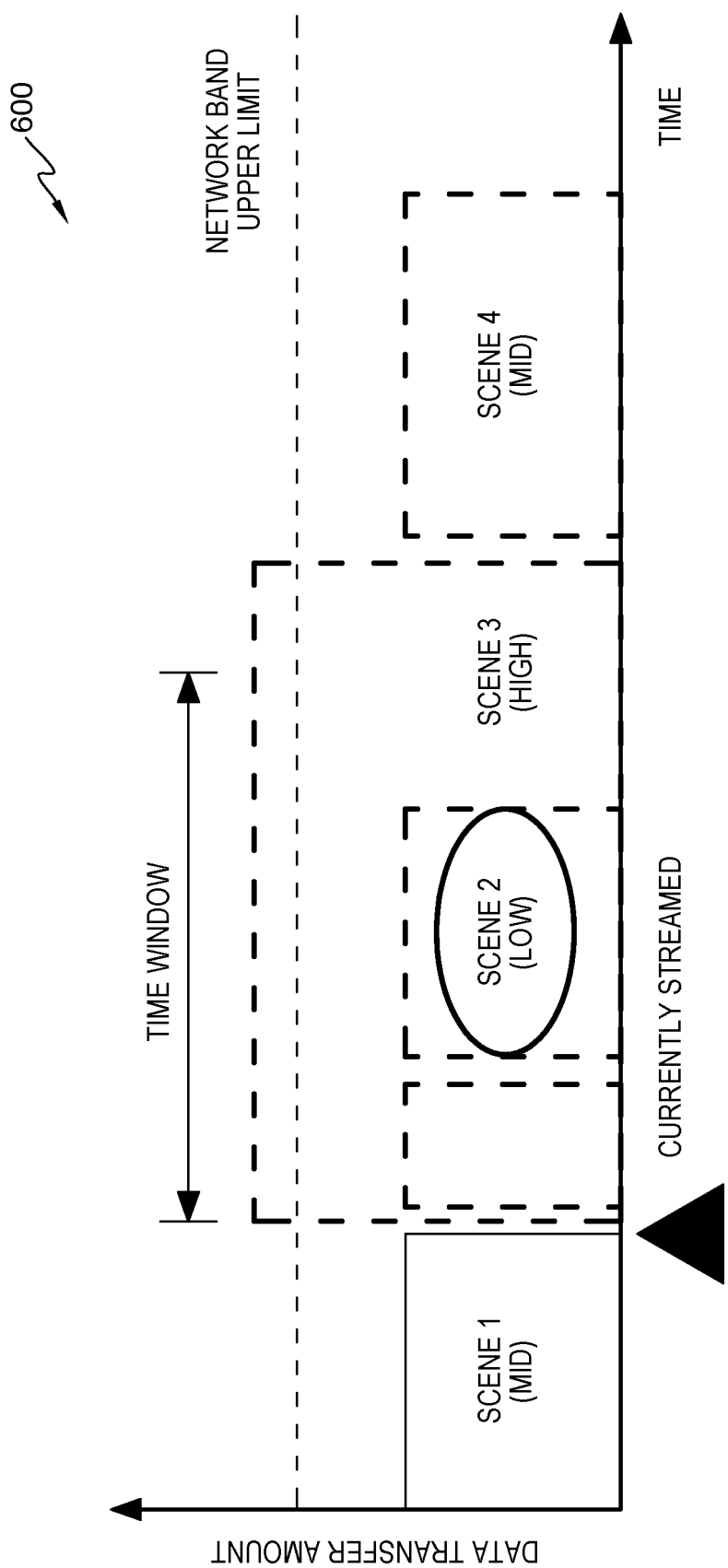
FIG. 6 is a diagram depicting a data transfer timeline for streaming multimedia data based on user preferences, generally designated 600, in accordance with at least one embodiment of the present invention.

FIG. 6 is a diagram depicting a data transfer timeline for streaming multimedia data based on user preferences, generally designated 600, in accordance with at least one embodiment of the present invention. In an embodiment, upon video streaming preference program 101 determining that prefetching and buffering cannot be accomplished without a delay in displaying the video to the user, video streaming preference program 101 determines whether any scenes within the predetermined time window have been designated as a low importance scene. As depicted in FIG. 6, video streaming preference program 101 has determined that SCENE 2 is of low importance and is within the predetermined time window.

Figure 7:
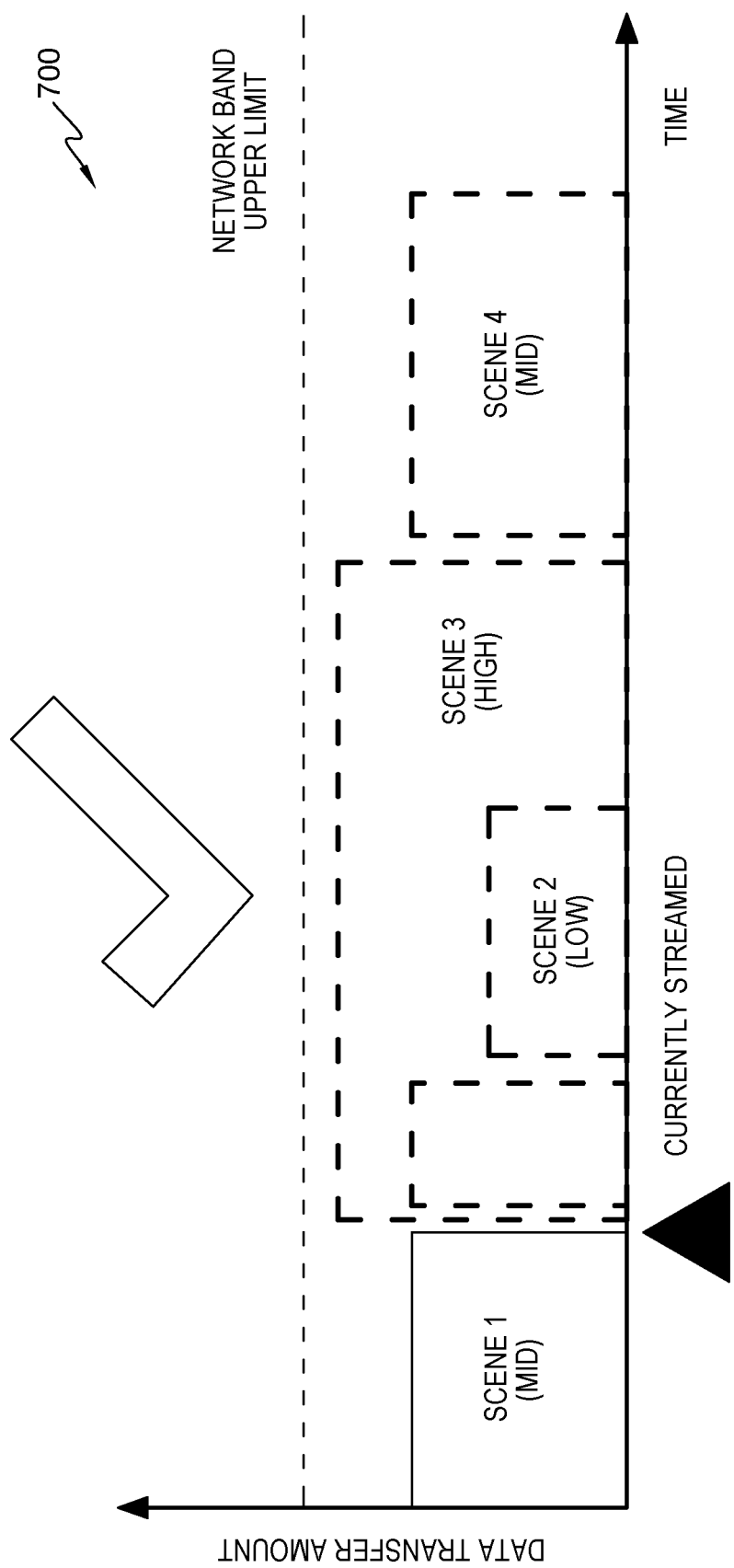
FIG. 7 is a diagram depicting a data transfer timeline for streaming multimedia data based on user preferences, generally designated 700, in accordance with at least one embodiment of the present invention.

FIG. 7 is a diagram depicting a data transfer timeline for streaming multimedia data based on user preferences, generally designated 700, in accordance with at least one embodiment of the present invention. FIG. 7 depicts prefetching and buffering the subsequent portion of SCENE 1, SCENE 2, and SCENE 3 in parallel. Here, video streaming preference program 101 reduces the amount of data transferred (i.e., reduces the video resolution) with respect to the low importance SCENE 2 to secure additional bandwidth to prefetch and buffer the high importance SCENE 3 at a video resolution above a predetermined threshold. In other words, video streaming program 101 decreases the data transfer amount of the low importance SCENE 2 in order to increase the data transfer amount of the high importance SCENE 3. The data transfer amount of SCENE 2 is reduced and the data transfer amount of SCENE 3 is increased as indicated by FIG. 7. This allows SCENE 3 to be prefetched and buffered at high quality (i.e., above a predetermined video resolution) without causing a delay in displaying the video to the user.

Figure 8:
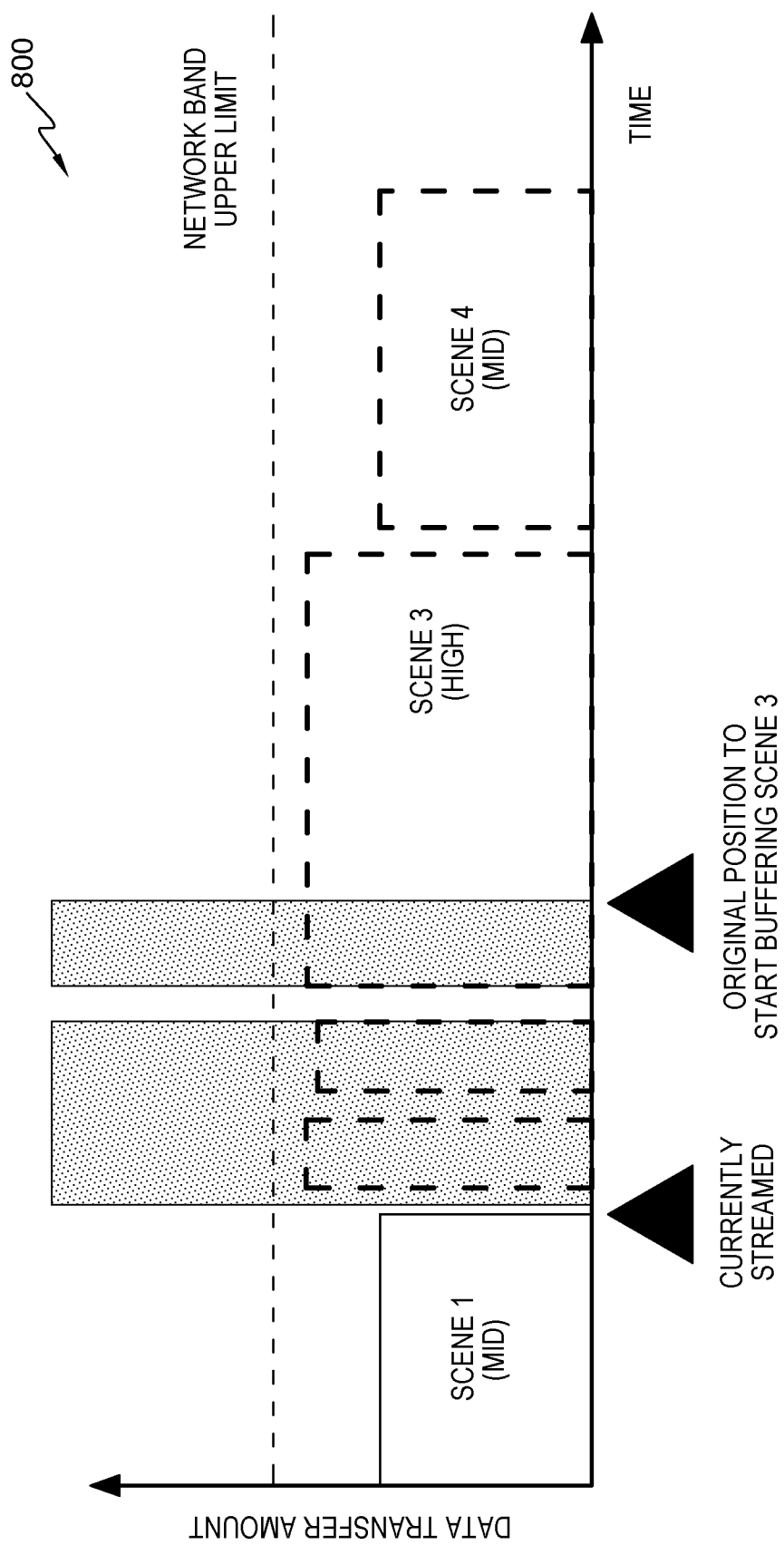
FIG. 8 is a diagram depicting a data transfer timeline for streaming multimedia data based on user preferences, generally designated 800, in accordance with at least one embodiment of the present invention.

FIG. 8 is a diagram depicting a data transfer timeline for streaming multimedia data based on user preferences, generally designated 800, in accordance with at least one embodiment of the present invention. FIG. 8 depicts prefetching and buffering the subsequent portion of SCENE 1, SCENE 2, and SCENE 3 in series. Here, video streaming preference program 101 increases the amount of buffering of a scene currently replicated in streaming to start buffering an important scene earlier than usual in order to secure a required transfer amount. As depicted in FIG. 8, video streaming preference program 101 finishes buffering the subsequent portion of SCENE 1 and SCENE 2 earlier than usual by increasing the buffer size. As a result, SCENE 3 can be prefetched and buffered earlier than usual, and thereby allowing buffering and streaming of SCENE 3 at a higher data transfer amount (i.e., higher video resolution) than possible under the current bandwidth (i.e., maximum data transfer rate) of the network.

FIG. 9 is a block diagram depicting components of a computing device, generally designated 900, suitable for video streaming preference program 101 in accordance with at least one embodiment of the invention. Computing device 900 includes one or more processor(s) 904 (including one or more computer processors), communications fabric 902, memory 906 including, RAM 916 and cache 918, persistent storage 908, which further includes video streaming preference program 101, communications unit 912, I/O interface(s) 914, display 922, and external device(s) 920. It should be appreciated that FIG. 9 provides only an illustration of one embodiment and does not imply any limitations with regard to the environments in which different embodiments may be implemented. Many modifications to the depicted environment may be made.

As depicted, computing device 900 operates over communications fabric 902, which provides communications between computer processor(s) 904, memory 906, persistent storage 908, communications unit 912, and input/output (I/O) interface(s) 914. Communications fabric 902 can be implemented with any architecture suitable for passing data or control information between processor(s) 904 (e.g., microprocessors, communications processors, and network processors), memory 906, external device(s) 920, and any other hardware components within a system. For example, communications fabric 902 can be implemented with one or more buses.

Memory 906 and persistent storage 908 are computer readable storage media. In the depicted embodiment, memory 906 includes random-access memory (RAM) 916 and cache 918. In general, memory 906 can include any suitable volatile or non-volatile computer readable storage media.

Program instructions for video streaming preference program 101 can be stored in persistent storage 908, or more generally, any computer readable storage media, for execution by one or more of the respective computer processor(s) 904 via one or more memories of memory 906. Persistent storage 908 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 912, in these examples, provides for communications with other data processing systems or devices. In these examples, communications unit 912 can include one or more network interface cards. Communications unit 912 may provide communications through the use of either or both physical and wireless communications links. In the context of some embodiments of the present invention, the source of the various input data may be physically remote to computing device 900 such that the input data may be received, and the output similarly transmitted via communications unit 912.

I/O interface(s) 914 allows for input and output of data with other devices that may operate in conjunction with computing device 900. For example, I/O interface(s) 914 may provide a connection to external device(s) 920, which may be as a keyboard, keypad, a touch screen, or other suitable input devices. External device(s) 920 can also include portable computer readable storage media, for example thumb drives, portable optical or magnetic disks, and memory cards. Software and data used to practice embodiments of the present invention can be stored on such portable computer readable storage media and may be loaded onto persistent storage 908 via I/O interface(s) 914. I/O interface(s) 914 also can similarly connect to display 922. Display 922 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 10 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 11:
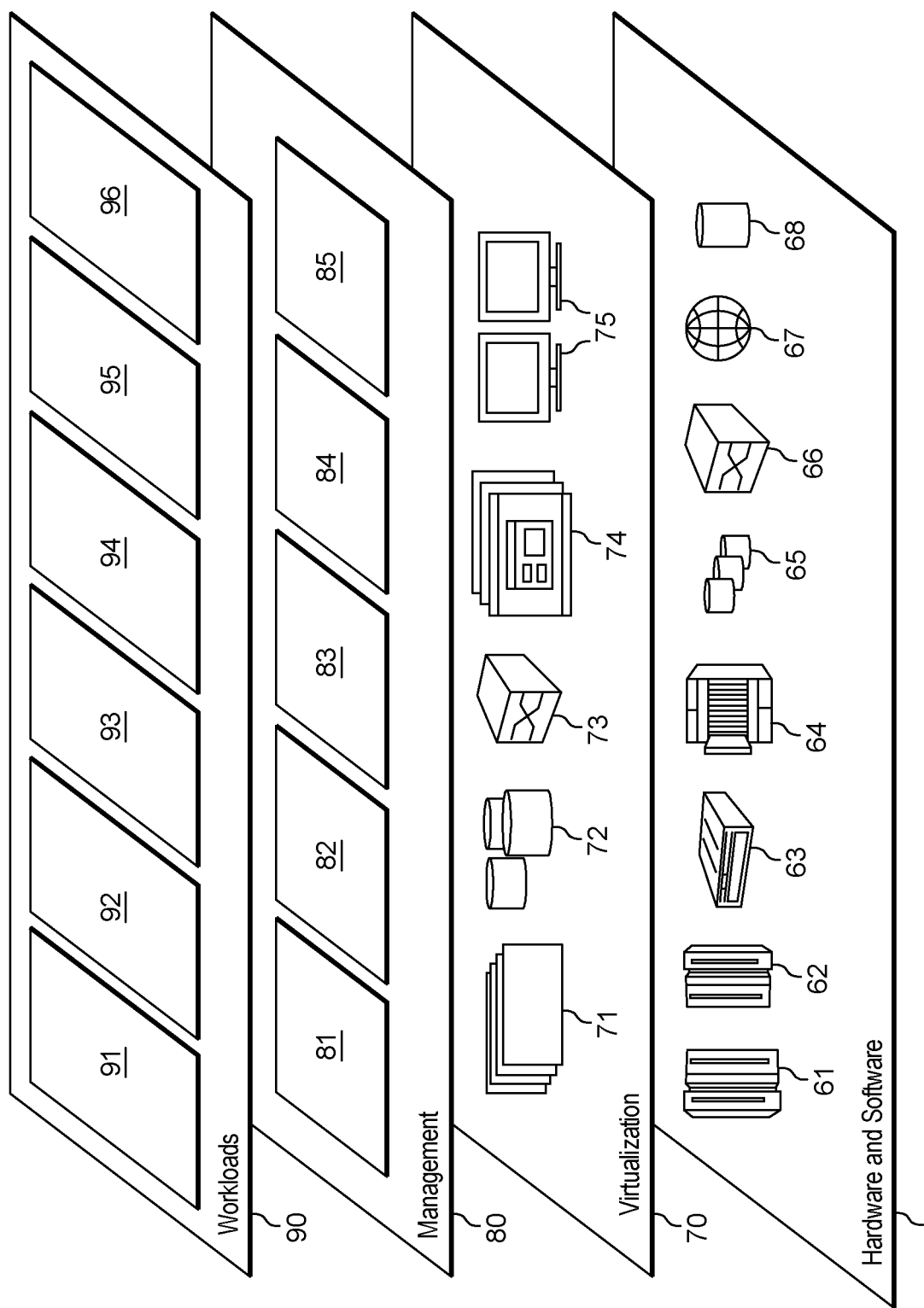
FIG. 11 is block diagram depicting a set of functional abstraction model layers provided by cloud computing environment 50 depicted in FIG. 10 in accordance with at least one embodiment of the present invention.

FIG. 11 is block diagram depicting a set of functional abstraction model layers provided by cloud computing environment 50 depicted in FIG. 10 in accordance with at least one embodiment of the present invention. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multimedia preference based streaming 96.

What is claimed is:

1. A computer-implemented method for streaming multimedia data, the computer-implemented method comprising:
   determining an importance level for one or more video segments of a video, wherein:
      the determining the importance level is based on comparing metadata associated with the one or more video segments against one or more user streaming preferences, the metadata indicating types of content in the one or more video segments; and the one or more user streaming preferences indicate types of content to be streamed at a higher quality;

identifying, based on the determining the importance level of the one or more video segments, a high importance video segment yet to be streamed to a buffer;

determining, based on a current network bandwidth, the high importance video segment cannot be streamed at a video quality above a predetermined threshold;

responsive to determining, based on the current network bandwidth, that the high importance video segment cannot be streamed at a video resolution above the predetermined threshold, determining, based on the determining the importance level of the one or more video segments, there is a low importance video segment yet to be streamed to the buffer prior to the high importance video segment; and responsive to determining that there is a low importance video segment yet to be streamed to the buffer prior to the high importance video segment, adjusting prefetching of the high importance video segment in order to stream the high importance video segment at the video resolution above the predetermined threshold.

2. The computer-implemented method of claim 1, further comprising:

determining that the high importance video segment and the low importance video segment are within a predetermined time window, wherein the predetermined time window begins at a current point in time at which a video segment is being streamed to the buffer.

3. The computer-implemented method of claim 1, wherein adjusting prefetching of the high importance video segment further comprises:

advancing a point in time at which one or more video segments prior to the high importance video segment are prefetched and buffered based, at least in part, on increasing a buffer size of the buffer.

4. The computer-implemented method of claim 1, wherein adjusting prefetching of the high importance video segment further comprises:

concurrently prefetching and buffering the high importance video segment and the low importance video segment.

5. The computer-implemented method of claim 4, wherein adjusting prefetching of the high importance video segment further comprises:

reducing a data transfer rate of the low importance video segment and increasing a data transfer rate of the high importance video segment.

6. The computer-implemented method of claim 5, wherein reducing the data transfer rate of the low importance video segment reduces a video resolution of the low importance video segment.

7. A computer program product for streaming multimedia data, the computer program product comprising one or more computer readable storage media and program instructions stored on the one or more computer readable storage media, the program instructions including instructions to:

determine an importance level for one or more video segments of a video, wherein:

the determination of the importance level is based on comparing metadata associated with the one or more video segments against one or more user streaming preferences, the metadata indicating types of content in the one or more video segments; and the one or more user streaming preferences indicate types of content to be streamed at a higher quality; the importance is based on content of each scene of the one or more segments;

identify, based on the determination that the importance level of the one or more video segments, a high importance video segment yet to be streamed to a buffer;

determine, based on a current network bandwidth, the high importance video segment cannot be streamed at a video quality above a predetermined threshold;

responsive to determining, based on the current network bandwidth, that the high importance video segment cannot be streamed at a video resolution above a predetermined threshold, determine, based on the determination that the importance level of the one or more video segments, there is a low importance video segment yet to be streamed to the buffer prior to the high importance video segment; and responsive to determining that there is a low importance video segment yet to be streamed to the buffer prior to the high importance video segment, adjust prefetching of the high importance video segment in order to stream the high importance video segment at the video resolution above the predetermined threshold.

8. The computer program product of claim 7, further comprising instructions to:

determine that the high importance video segment and the low importance video segment are within a predetermined time window, wherein the predetermined time window begins at a current point in time at which a video segment is being streamed to the buffer.

9. The computer program product of claim 7, wherein the instructions to adjust prefetching of the high importance video segment further comprises instructions to:

advance a point in time at which one or more video segments prior to the high importance video segment are prefetched and buffered based, at least in part, on increasing a buffer size of the buffer.

10. The computer program product of claim 7, wherein the instructions to adjust prefetching of the high importance video segment further comprises instructions to:

concurrently prefetch and buffer the high importance video segment and the low importance video segment.

11. The computer program product of claim 10, wherein the instructions to adjust prefetching of the high importance video segment further comprises instructions to:

reduce a data transfer rate of the low importance video segment and increasing a data transfer rate of the high importance video segment.

12. The computer program product of claim 11, wherein the instructions to reduce the data transfer rate of the low importance video segment reduces a video resolution of the low importance video segment.

13. A computer system for streaming multimedia data, comprising:

one or more computer processors;
one or more computer readable storage media;
computer program instructions;
the computer program instructions being stored on the one or more computer readable storage media for execution by the one or more computer processors; and
the computer program instructions including instructions to:

determine an importance level for one or more video segments of a video, wherein:
  the determination of the importance level is based on comparing metadata associated with the one or more video segments against one or more user streaming preferences, the metadata indicating types of content in the one or more video segments; and
  the one or more user streaming preferences indicate types of content to be streamed at a higher quality;
the importance is based on content of each scene of the one or more segments;
  identify, based on the determination that the importance level of the one or more video segments, a high importance video segment yet to be streamed to a buffer;
  determine, based on a current network bandwidth, the high importance video segment cannot be streamed at a video quality above a predetermined threshold;
  responsive to determining, based on the current network bandwidth, that the high importance video segment cannot be streamed at a video resolution above a predetermined threshold, determine, based on the determination that the importance level of the one or more video segments, there is a low importance video segment yet to be streamed to the buffer prior to the high importance video segment; and
  responsive to determining that there is a low importance video segment yet to be streamed to the buffer prior to the high importance video segment, adjust prefetching of the high importance video segment in order to stream the high importance video segment at the video resolution above the predetermined threshold.

14. The computer system of claim 13, further comprising instructions to:
  determine that the high importance video segment and the low importance video segment are within a predetermined time window, wherein the predetermined time window begins at a current point in time at which a video segment is being streamed to the buffer.

15. The computer system of claim 13, wherein the instructions to adjust prefetching of the high importance video segment further comprises instructions to:
  advance a point in time at which one or more video segments prior to the high importance video segment are prefetched and buffered based, at least in part, on increasing a buffer size of the buffer.

16. The computer system of claim 13, wherein the instructions to adjust prefetching of the high importance video segment further comprises instructions to:
  concurrently prefetch and buffer the high importance video segment and the low importance video segment.

17. The computer system of claim 16, wherein the instructions to adjust prefetching of the high importance video segment further comprises instructions to:
  reduce a data transfer rate of the low importance video segment and increasing a data transfer rate of the high importance video segment.

* * * * *